July 7, 1936.  A. T. RATLIFF ET AL  2,047,130
PROCESS OF DECORTICATION OF FIBROUS PLANTS
Filed March 5, 1935   2 Sheets—Sheet 1
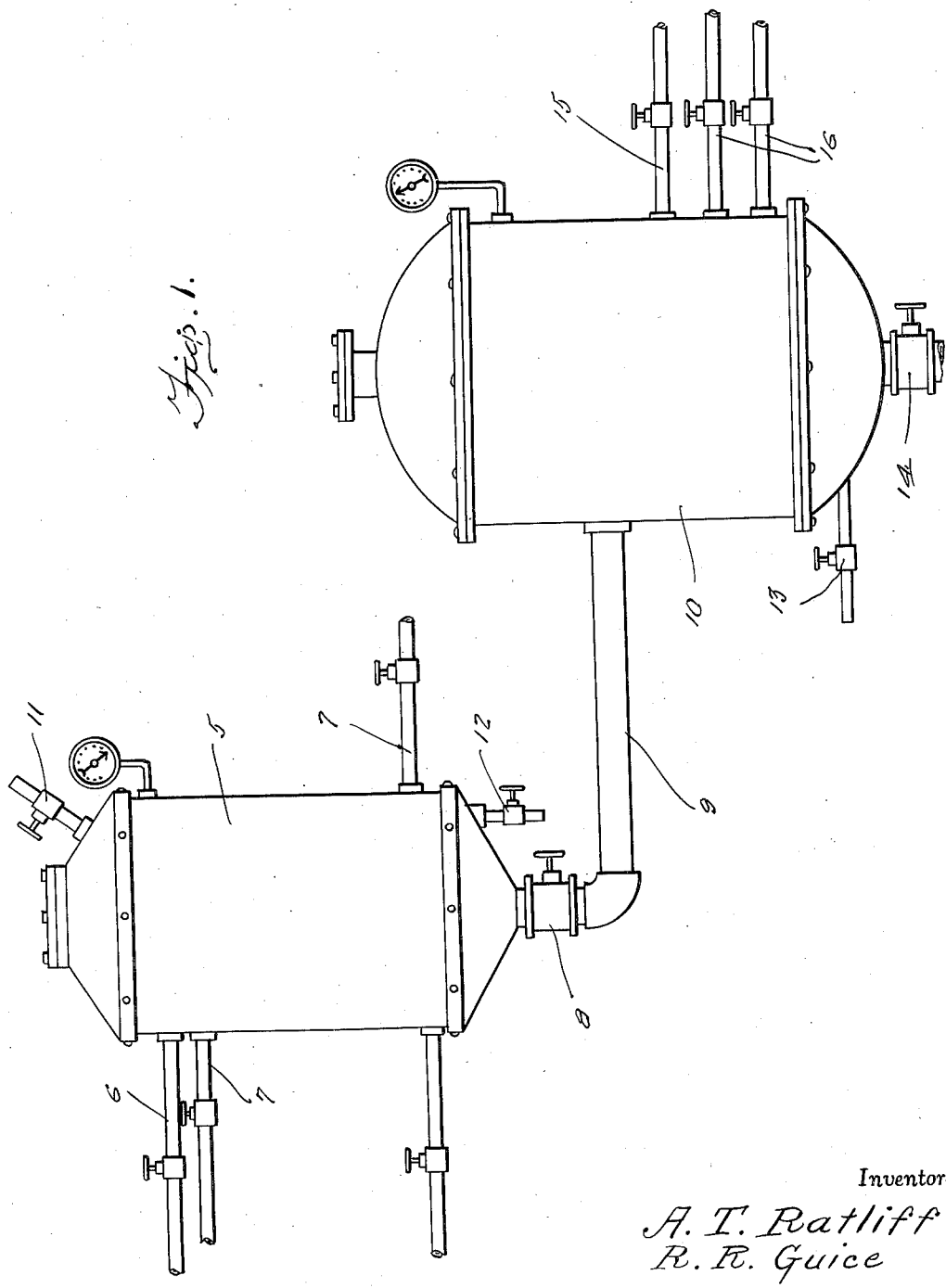
Inventors
*A. T. Ratliff*
*R. R. Guice*
By *Clarence A. O'Brien*
Attorney July 7, 1936.  A. T. RATLIFF ET AL  2,047,130
PROCESS OF DECORTICATION OF FIBROUS PLANTS
Filed March 5, 1935  2 Sheets-Sheet 2
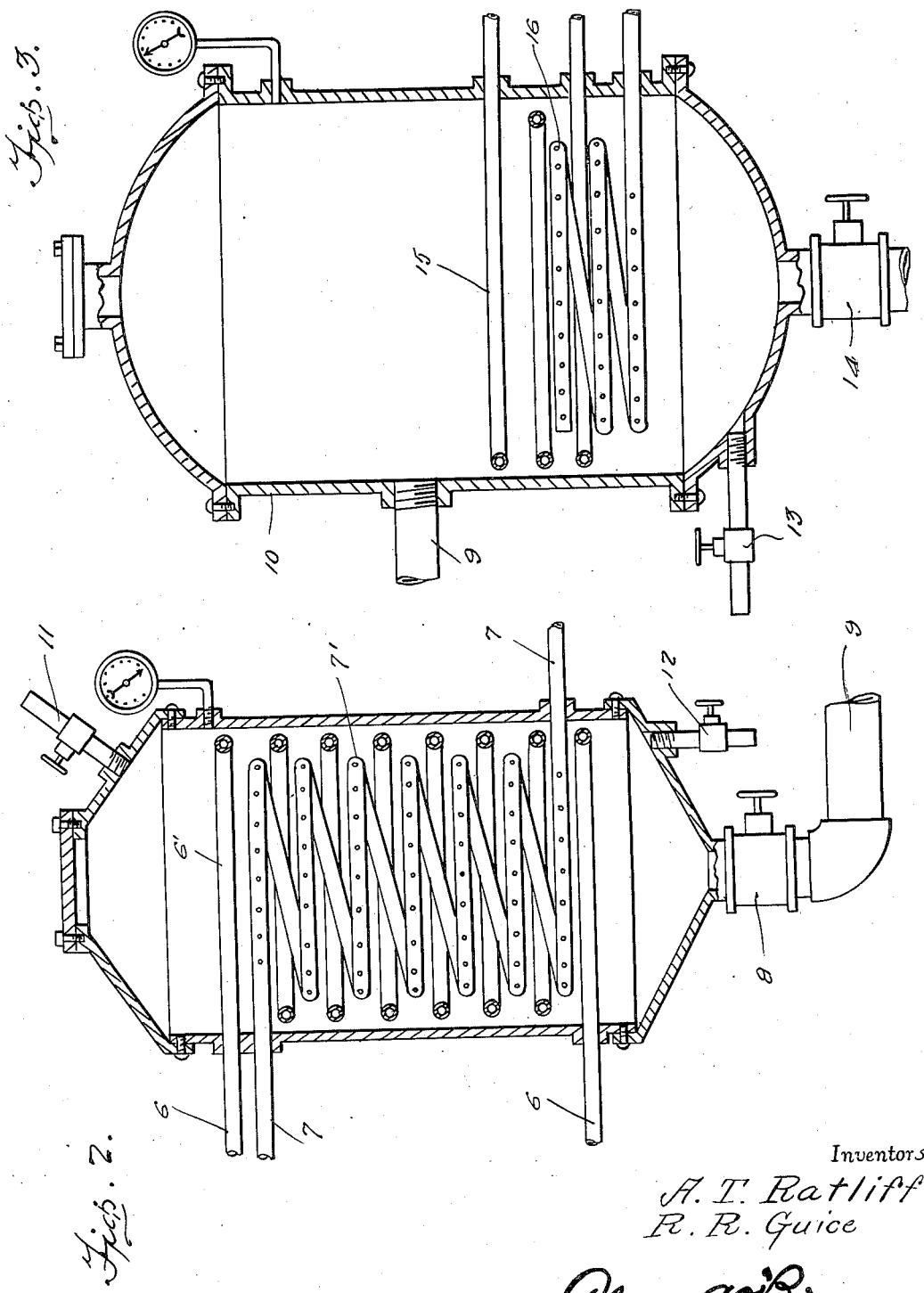
Inventors
A. T. Ratliff
R. R. Guice
By Clarence A O'Brien
Attorney Patented July 7, 1936

2,047,130

UNITED STATES PATENT OFFICE 2,047,130

PROCESS OF DECORTICATION OF FIBROUS PLANTS

Albert T. Ratliff and Richard R. Guice, Hattiesburg, Miss., assignors to The Pine-Felt Corporation of Mississippi, Petal, Miss., a corporation of Mississippi Application March 5, 1935, Serial No. 9,505

1 Claim. (Cl. 92—7)

This invention appertains to new and useful improvements in processes for the decortication of fibrous plants and more especially where the fibrous plants are light and bulky, such as pine needles, cotton stalks, etc.

The principal object of the present invention is to provide a process for the rapid and economical production of raw paper pulp, raw cordage fibre, upholstery material, such as used in mattresses, furniture, felting, insulating board, sound-proof board and the like.

Other important objects and advantages of the invention will become apparent to the reader of the following specification.

In the drawings:

Figure 1 represents a side elevational view of the pre-wilter tank and digester inter-connected.

Figure 2 represents a vertical sectional view through the pre-wilter tank.

Figure 3 represents a vertical sectional view through the digester.

Some of the aforementioned plants have heretofore been used in connection with various preliminary treatment whereby the fibre and pulpy substances have been softened and disintegrated chemically, mechanically and otherwise previous to the separating process, this feature of the present subject matter being distinguished therefrom by providing means for subjecting the material to the action of steam or hot water under pressure to remove any water, soluble acids, gummy material, volatile products therefrom, and then rapidly discharging the contents of the steam-tight vessel into another suitable vessel which tends to open the fibre by the rapid expansion and force of the steam or hot water which forces the material into a finely divided state, and also pre-wilts same so that a larger quantity of the raw material pre-digested charge in the second step of the operation may be obtained.

Referring to the drawings wherein like numerals designate like parts, it can be seen that the tank 5 is a steam-tight vessel, having at its top an accessible opening for the loading thereof with raw material. After the pre-wilter tank 5 is filled, the same is filled with water. Subsequently to this the steam line 6 connected to a closed heating coil 6' and having its outlet as at 6² is turned on from a suitable steam supply after it is brought up to a boiling point of water. The steam may be closed on this line and admitted through the steam line 7 which is connected to a perforated coil 7', which admits steam directly into the contents of the vessel 5 until the desired pressure has reached the predetermined amount, at which point the quick opening valve 8 is actuated to discharge the contents of the tank 5 through the pipe 9 to the digester 10.

In the preliminary cooking of raw material in the tank 5, acids, volatile products, etc., may be blown off at the vent 11, or drawn off at the outlet 12, or drawn off at the outlet valve 13 in the digester 10, after the contents of the pre-wilter 5 has been discharged into the digester 10.

When the contents of the pre-wilter tank 5 are blown into the digester 10, the same is filled with water, with or without suitable chemical, to further dissolve or soften any gummy material which is still left therein. When the contents of the digester 10 has been cooked or digested for a predetermined period of time, the contents are then discharged through the conduit valve 14 and discharged to a suitable refining plant. It is, of course, understood that the heating of the digester 10 is obtained through the short closed coil 15, while merging with the convolutions of the coil 15 and extending somewhat below the coil 15 is a perforated coil 16, these coils 15 and 16 serving the same purpose as the coils 6' and 7' in the pre-wilter tank.

While the foregoing specification sets forth the invention in specific terms, it is to be understood that numerous changes in the shape, size and materials may be resorted to without departing from the spirit and scope of the invention as claimed hereinafter.

Having thus described the invention, what is claimed as new is:

A process of treating bulky fibrous plants consisting in first prewilting the matter by subjecting it to an application of steam and heat from separate sources to wilt the same, and dispatching the wilted material to a digester and there treating same with hot water under pressure, with or without a suitable chemical to further dissolve any gummy material, to effect a further disintegration of the fiber.

ALBERT T. RATLIFF.
RICHARD R. GUICE.